(12) United States Patent
Okuno et al.

(10) Patent No.: US 6,907,172 B2
(45) Date of Patent: Jun. 14, 2005

(54) OPTICAL TRANSMISSION LINE AND OPTICAL COMMUNICATION SYSTEM

(75) Inventors: Toshiaki Okuno, Kanagawa (JP); Masayuki Nishimura, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 134 days.

(21) Appl. No.: 10/228,267

(22) Filed: Aug. 27, 2002

(65) Prior Publication Data

US 2003/0044146 A1 Mar. 6, 2003

(30) Foreign Application Priority Data

Aug. 29, 2001 (JP) ........................................ 2001-259832

(51) Int. Cl.[7] .............................. G02B 6/20; G02B 6/02
(52) U.S. Cl. ........................ 385/126; 385/127; 398/81
(58) Field of Search ................................ 385/123–128; 398/81

(56) References Cited

U.S. PATENT DOCUMENTS

| | | | |
|---|---|---|---|
| 5,611,016 A | | 3/1997 | Fangmann et al. |
| 5,778,128 A | * | 7/1998 | Wildeman .................. 385/123 |

(Continued)

FOREIGN PATENT DOCUMENTS

| | | |
|---|---|---|
| EP | 1 076 250 A1 | 2/2001 |
| JP | 11-38256 | 2/1999 |
| JP | 11-355206 | 12/1999 |
| WO | WO 00/42458 | 7/2000 |

OTHER PUBLICATIONS

"Optimum dispersion of non–zero dispersion shifted fiber for high bit rate DWDM systems", Toshiaki Okuno et al., Proceeding of OFC2001, TuH4–1–TuH4–3 (2001).

Kazuhide Nakajima, et al., "Four–Wave Mixing Suppression Effect of Dispersion Distributed Fibers", Journal of Lightwave Technology, vol. 17, No. 10, Oct. 1999.

(Continued)

*Primary Examiner*—Edward J. Glick
*Assistant Examiner*—Thomas R. Artman
(74) *Attorney, Agent, or Firm*—McDermott Will & Emery LLP

(57) ABSTRACT

An optical communication system has a configuration in which an optical transmission line is laid between a repeater (transmitter) and another repeater (receiver). The optical transmission line is formed by fusion-splicing a first optical fiber on the upstream side and a second optical fiber on the downstream side. The first optical fiber has a transmission loss of 0.25 dB or less, and an effective area of 80 $\mu m^2$ or above (preferably 100 $\mu m^2$ or above), at a wavelength of 1550 nm, which is the wavelength of signal light. The second optical fiber is connected to the downstream end of the first optical fiber and has positive dispersion regions and negative dispersion regions which are alternately arranged along the longitudinal direction and whose chromatic dispersions at a wavelength of 1550 nm are positive and negative, respectively.

35 Claims, 9 Drawing Sheets

U.S. PATENT DOCUMENTS

| | | | | |
|---|---|---|---|---|
| 5,838,867 A | * | 11/1998 | Onishi et al. | 385/123 |
| 5,878,182 A | * | 3/1999 | Peckham | 385/123 |
| 5,887,105 A | * | 3/1999 | Bhagavatula et al. | 385/123 |
| 5,894,537 A | | 4/1999 | Berkey et al. | |
| 5,995,694 A | | 11/1999 | Akasaka et al. | |
| 6,084,993 A | | 7/2000 | Mukasa | |
| 6,178,279 B1 | | 1/2001 | Mukasa et al. | |
| 6,301,419 B1 | * | 10/2001 | Tsukitani et al. | 385/123 |
| 6,404,964 B1 | * | 6/2002 | Bhagavatula et al. | 385/123 |
| 6,421,490 B1 | * | 7/2002 | Liu | 385/127 |
| 6,501,892 B1 | * | 12/2002 | Okuno et al. | 385/127 |
| 6,535,660 B1 | * | 3/2003 | Judy | 385/15 |
| 6,556,758 B2 | * | 4/2003 | Kato | 385/127 |
| 6,580,861 B2 | * | 6/2003 | Bickham et al. | 385/123 |
| 6,724,966 B2 | * | 4/2004 | Mukasa | 385/127 |

OTHER PUBLICATIONS

S.N. Knudsen, et al., "420 Gbit/s (42×10 Gbit/s) WDM Transmission Over 4000 km of Ultrawave Fibre with 100 km Dispersion–Managed Spans and Distributed Raman Amplification", Electronics Letters, vol. 37, No. 15, Jul. 19, 2001.

A. Bertaina, et al., "Impact of the Fiber Infrastructure on WDM Transmission Each Link of a 10 Gbit/s Terrestrial WDM Transmission System Must be Designed to Cope with the Physical Limitations of the Fiber", Electrical Communication, Alcatel. Brussels, BE, No. Quart3rd, 1998, pp. 210–217, XP000846713.

Stig Nissen Knudsen, et al., "Large Effective Area Dispersion Compensating Fiber for Cabled Compensation of Standard Single Mode Fiber", Optical Fiber Communication Conference. Technical Digest Postconference Edition. Baltimore, MD, Mar. 7–10, 2000, New York, NY: IEEE, US, vol. 1 of 4, Mar. 7, 2000, pp. TUG5–1–TUG5–3, XP001017404.

* cited by examiner

OPTICAL TRANSMISSION LINE AND OPTICAL COMMUNICATION SYSTEM

BACKGROUND OF THE INVENTION

1. Field of the Invention

The present invention relates to an optical transmission line for transmitting signal light, and to an optical communication system including the same.

2. Description of the Related Art

The optical communication system is used for transmitting information by transmitting signal light through an optical transmission line, and is capable of transmitting a large capacity of information. When transmitting signal light through the optical transmission line, it is important to suppress the degradation of a signal. From this viewpoint, it is desirable that the overall dispersion of an optical transmission line has a small absolute value even in the case of a long transmission distance. It is also desirable that the optical transmission line be subject to less non-linear optical phenomena.

In general, a standard single-mode optical fiber used as an optical transmission line has a zero dispersion wavelength in the vicinity of a wavelength of 1.3 $\mu$m, and has a chromatic dispersion of about +17 ps/nm/km with a dispersion slope thereof being positive, in the vicinity of a wavelength of 1.55 $\mu$m, which is the signal light wavelength thereof. Therefore, forming the optical transmission line in a relay section using single-mode optical fibers alone would not allow the optical transmission line to have a small absolute value of cumulative dispersion for a long transmission distance. Under such circumstances, various proposals have hitherto been made for optical transmission lines having a small absolute value of the cumulative dispersion even in the case of a long transmission distance.

For example, Japanese Unexamined Patent Application Publication No. 11-355206, and U.S. Pat. Nos. 5,778,128, 5,611,016, and 6,178,279 each disclose an optical transmission line (related art 1) in which a positive-dispersion optical fiber and a negative-dispersion optical fiber are connected in series or they are alternately connected.

U.S. Pat. No. 6,084,993 discloses an optical transmission line (related art 2) that has a configuration in which a non-linearity diminishing optical fiber with a large effective area, a dispersion adjusted transmission optical fiber with a small negative chromatic dispersion, and an optical fiber for diminishing and adjusting a dispersion slope, which is used to adjust the overall dispersion slope, are connected in this order.

U.S. Pat. No. 5,995,694 discloses an optical transmission line (related art 3) that has a configuration in which a standard single-mode optical fiber, a dispersion compensation optical fiber, of which the chromatic dispersion and the dispersion slope are both negative, and a dispersion flat optical fiber with a dispersion slope of a small absolute value, are connected in this order.

Also, U.S. Pat. No. 5,894,537 discloses an optical transmission line (related art 4), which is a so-called "dispersion managed optical fiber". The dispersion managed optical fiber is formed such that positive dispersion regions each having a positive chromatic dispersion, and negative dispersion regions each having a negative chromatic dispersion are alternately disposed along the longitudinal direction thereof.

SUMMARY OF THE INVENTION

It is an object of the present invention to provide an optical transmission line capable of a long-distance transmission with superior transmission quality of signal light, and to provide an optical communication system including the same.

To achieve the above-described object, the optical transmission line according to the present invention comprises a first optical fiber having an effective area not smaller than 80 $\mu$m$^2$ at a wavelength of 1550 nm and a second optical fiber connected to the first optical fiber, the second optical fiber having at least one positive dispersion region in which the chromatic dispersion is positive and at least one negative dispersion region in which the chromatic dispersion is negative, along the longitudinal direction thereof at a predetermined wavelength in a signal wavelength band, respectively.

The first optical fiber may have a core formed of substantially pure silica glass. At a predetermined wavelength, the effective area of the first optical fiber may be not less than 100 $\mu$m$^2$, and the overall dispersion thereof may be not more than 400 ps/nm. The transmission loss of the first optical fiber may be not more than 0.25 dB/km, and the transmission loss thereof may be less than that of the second optical fiber.

In the second optical fiber, the absolute value of a dispersion slope in the positive dispersion region may be 0.04 ps/nm$^2$/km or below, and the absolute value of a dispersion slope in the negative dispersion region may be 0.04 ps/nm$^2$/km or below, as well. The absolute value of the overall dispersion of the second optical fiber may be 100 ps/nm or below, and the absolute value of the average chromatic dispersion thereof may be 5 ps/nm/km or below. Moreover, in the second optical fiber, positive dispersion regions and negative dispersion regions may be alternately arranged along the longitudinal direction thereof. The chromatic dispersion in the at least one positive dispersion region may be 5 ps/nm/km or more, and its length may be 5 km or below. The absolute value of the chromatic dispersion in the at least one negative dispersion region may be 5 ps/nm/km or above, and its length may be 5 km or below. The average chromatic dispersion in the at least one positive dispersion region may be 4 ps/nm/km or more, and the absolute, value of the average chromatic dispersion in the at least one negative dispersion region may be 4 ps/nm/km or above. Also, the negative dispersion region may be connected to the first optical fiber.

The second optical fiber may comprise a core having a first refractive index, a first cladding having a second refractive index lower than the first refractive index, and a second cladding surrounding the first cladding and having a third refractive index higher than the second refractive index. The second optical fiber may further comprise a third cladding surrounding the second cladding and having a fourth refractive index lower than the third refractive index.

Alternatively, the second optical fiber may comprise a first core including an optical axis at the center thereof and having a first refractive index, a second core surrounding the first core and having a second refractive index higher than the first refractive index, and a cladding having a third refractive index lower than the second refractive index. The second optical fiber may further comprise a second cladding surrounding the first cladding and having a fourth refractive index higher than the third refractive index.

The optical transmission line according to the present invention may be arranged so that the polarization mode dispersion thereof is not more than 0.2 ps/km$^{1/2}$ at the predetermined wavelength. Also, the present optical transmission line may be arranged such that the first optical fibers are connected to both ends of the second optical fiber.

The optical transmission line according to the present invention may further comprise a dispersion compensator for reducing the absolute values of the chromatic dispersions of both the first and second optical fibers at a predetermined wavelength. The present optical transmission line may further comprise a third optical fiber provided for reducing the absolute values of the chromatic dispersions of both the first and second optical fibers at the predetermined wavelength. At the predetermined wavelength, this third optical fiber may have a chromatic dispersion of −30 ps/nm/km or less and an effective area of 15 $\mu$m$^2$ or above. The absolute value of the overall dispersion of the present optical transmission line may be not more than 100 ps/km at the predetermined wavelength.

In addition, to achieve the above-described object, the present invention provides an optical communication system which includes the optical transmission line according to the present invention, and in which an optical communication is performed by transmitting signal light through a first optical fiber, a second optical fiber (and furthermore, a third optical fiber) of the above-described optical transmission line, in this order. The optical communication system according to the present invention may further comprise pump light supplying means that supplies pump light propagating in the direction opposite to the propagating direction of the signal light in the optical transmission line. By supplying the pump light to the optical transmission line by the pump light supplying means, the signal light may be Raman-amplified in the optical transmission line.

The present invention is further explained below by referring to the accompanying drawings. The drawings are provided solely for the purpose of illustration and are not intended to limit the scope of the invention.

BRIEF DESCRIPTION OF THE DRAWINGS

FIG. 1A shows the configuration of this optical communication system, FIG. 1B shows the cumulative dispersion at each position of this optical transmission line, and FIG. 1C shows the signal light power at each position on the optical transmission line.

FIG. 3A shows the outline of the second optical fiber, FIG. 3B shows the chromatic dispersion at each position of the second optical fiber, and FIG. 3C shows the cumulative dispersion at each position of the second optical fiber.

FIG. 8A shows their outline at the vicinity of the connection, FIG. 8B shows the chromatic dispersion at the vicinity of the connection, and FIG. 8C shows the cumulative dispersion at the vicinity of the connection.

FIG. 9A shows the configuration of the optical communication system, FIG. 9B shows the cumulative dispersion at each position of the optical transmission line, and FIG. 9C shows the signal light power at each position of the optical transmission line.

FIG. 10A shows the configuration of the optical communication system, and FIG. 10B shows the signal light power at each position of the optical transmission line.

FIG. 11A shows the configuration of the optical communication system, FIG. 11B shows the cumulative dispersion at each position of the optical transmission line, and FIG. 11C shows the signal light power at each position of the optical transmission line.

FIG. 12A shows the configuration of the optical communication system, FIG. 12B shows the cumulative dispersion at each position of the optical transmission line, and FIG. 12C shows the signal light power at each position of the optical transmission line.

DESCRIPTION OF THE PREFERRED EMBODIMENTS

Figure 1A:
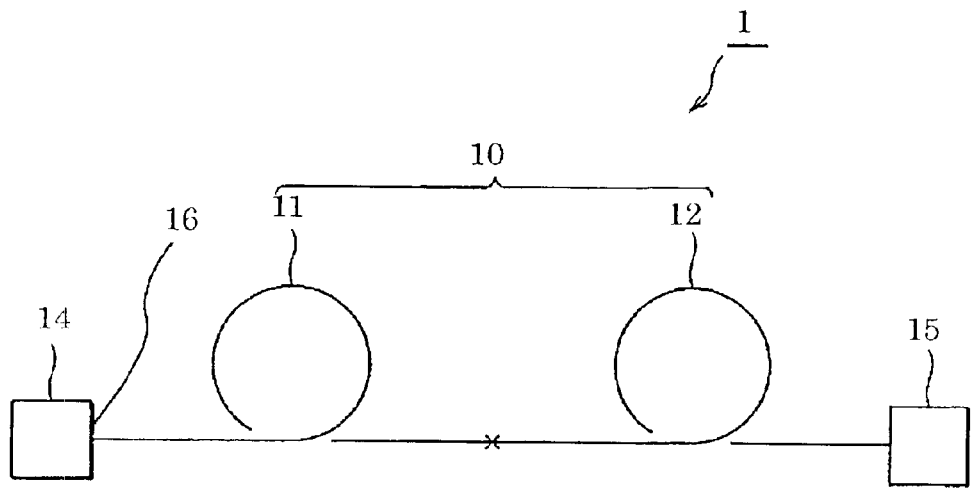
FIGS. 1A to 1C illustrate an optical communication system and an optical transmission line according to a first embodiment of the present invention, where
Figure 1B:
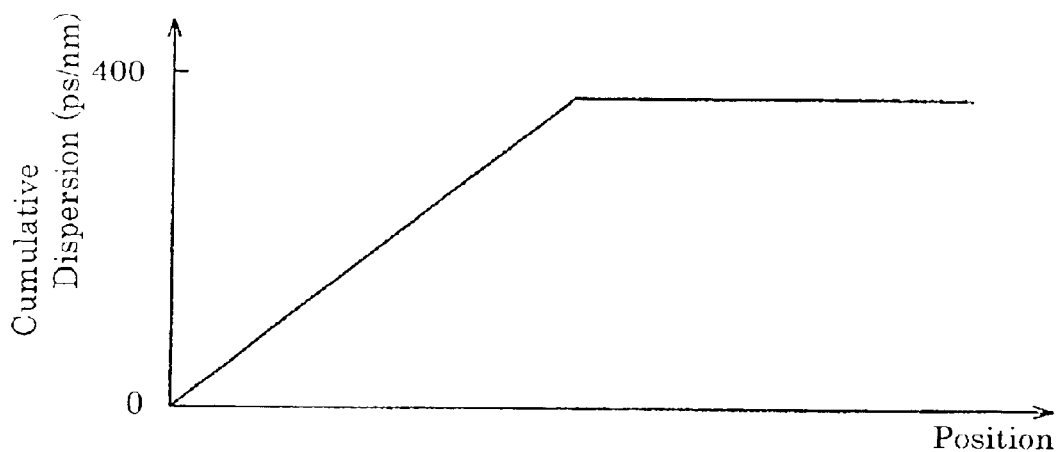
Figure 1C:
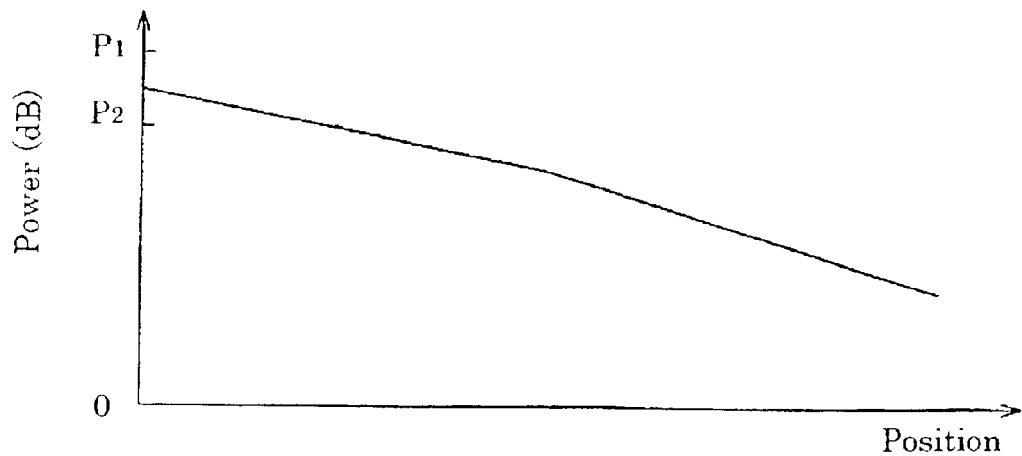

Embodiments of the present invention are explained below by referring to the accompanying drawings. In the drawings, the same number refers to the same part to avoid duplicate explanation. The ratios of the dimensions in the drawings do not necessarily coincide with the explanation.
First Embodiment First, descriptions will be made of a first embodiment of an optical communication system and an optical transmission line according to the present invention. FIGS. 1A to 1C illustrate the optical communication system 1 and the optical transmission line 10 according to the first embodiment. Here, FIG. 1A shows the configuration of the optical communication system 1, FIG. 1B shows the cumulative dispersion at each position of the optical transmission line 10, and FIG. 1C shows the signal light power at each position of the optical transmission line 10.

As shown in FIG. 1A, the optical communication system 1 has a configuration in which the optical transmission line 10 is laid between a repeater (or transmitter) 14 and a repeater (or receiver) 15. The optical transmission line 10 is formed by fusion-splicing a first optical fiber 11 and a second optical fiber 12 that are arranged in this order from the upstream side to the downstream side.

At a wavelength of 1550 nm, the optical fiber 11 has an effective area of 80 $\mu$m$^2$ or above, and preferably 100 $\mu$m$^2$ or above. Also, the optical fiber 11 preferably has a transmission loss of 0.25 dB/km or less at the signal light wavelength thereof. That is, the optical fiber 11 is of a low-loss and low non-linearity type. For example, the optical fiber 11 is a single-mode optical fiber having its zero dispersion wavelength in the vicinity of a wavelength of 1.3 $\mu$m, and having a chromatic dispersion of about 17 to 20 ps/nm/km in the vicinity of the signal light wavelength of 1.55 $\mu$m.

The optical fiber 12 is connected to the downstream end of the optical fiber 11, and has at least one positive dispersion region in which the chromatic dispersion is positive and at least one negative dispersion region in which the chromatic dispersion is negative, respectively along the longitudinal direction at the wavelength of 1550 nm. The optical fiber 12, when the positive dispersion regions and the negative dispersion regions are alternately arranged, is a dispersion managed optical fiber. FIGS. 1A to 1C show an example in the case of a dispersion-managed optical fiber.

As illustrated in FIG. 1B, there are differences between the optical fiber 11 section and the optical fiber 12 section in the cumulative dispersion from the incident position 16 to each position on the optical transmission line 10. Specifically, in the optical fiber 11 section, where the chromatic dispersion thereof is constant, the cumulative dispersion gradually increases with an increase in the propagation distance from the incident position 16. On the other hand, in the optical fiber 12 section, where positive dispersion regions and negative dispersion regions are alternately arranged, the change in the cumulative dispersion thereof is small.

As illustrated in FIG. 1C, the signal light power at each position on the optical transmission line 10 gradually decreases in both the optical fiber 11 and 12 sections. Here, the optical fiber 11 has a lower loss than the optical fiber 12.

In the optical communication system 1, the signal light emitted from the repeater 14 and having a predetermined wavelength (e.g., 1550 nm) in a signal wavelength band (a portion of a wavelength range of 1250 nm to 1700 nm), first propagates through the optical fiber 11, then propagates through the optical fiber 12, and reaches the repeater 15. In the optical fiber 11, although the power of propagating signal light is relatively high, there is less occurrence of non-linear optical phenomena such as four-wave mixing, since the optical fiber 11 having an relatively large effective area is of low non-linearity. In the optical fiber 12, the occurrence of non-linear optical phenomena such as four-wave mixing is also relatively rare, since the power of the propagating signal light is relatively low, and the absolute value of the chromatic dispersion of each of the positive and negative dispersion regions of the optical fiber 12 is relatively large. Thus, the occurrence of non-linear optical phenomena is reduced over the entire optical transmission line 10, and accordingly signal degradation is suppressed.

As illustrated in FIG. 1C, the power of the signal light at the incident position 16 is set to a predetermined power $P_1$ or less so that the degree of signal degradation due to non-linear optical phenomena in the optical fiber 11 falls within a tolerable range. Also, the signal light emitted from the optical fiber 11 is designed to have a predetermined power $P_2$ or less when the signal light is incident upon the optical fiber 12, by adjusting the length of the optical fiber 11, so that the degree of signal degradation due to non-linear optical phenomena in the optical fiber 12 falls within a tolerable range.

As illustrated in FIG. 1B, even if the cumulative dispersion at each position on the optical transmission line 10 exceeds the overall dispersion of the optical fiber 11, the excess amount is negligible. Therefore, even if the optical transmission line 10 is long, the transmission quality of signal light will be superior. From this viewpoint, it is preferable that the overall dispersion of the optical fiber 11 be not more than 400 ps/nm at a wavelength of 1550 nm.

Figure 2:
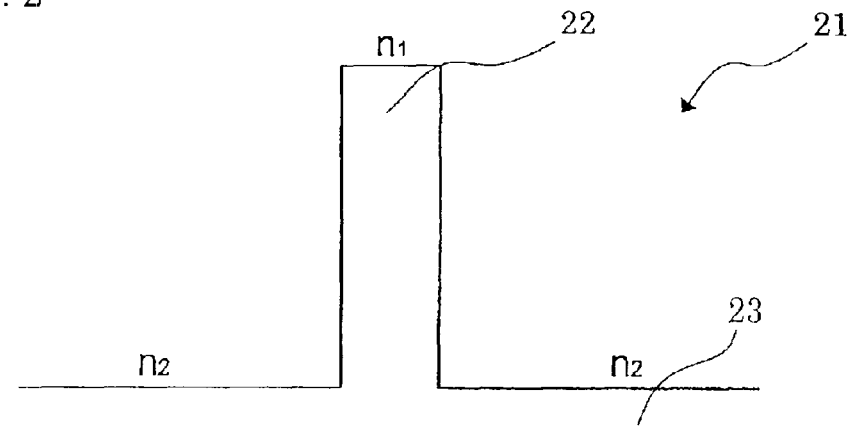
FIG. 2 shows a refractive index profile of a first optical fiber 11.

FIG. 2 shows a refractive index profile of the optical fiber 11. The lo illustrated optical fiber 11 having a refractive index profile 21 comprises a core 22 including an optical axis at the center thereof and having a refractive index of $n_1$, and a cladding 23 surrounding the core 22 and having a refractive index of $n_2$. Here, $n_1 > n_2$. The optical fiber 11 is formed by using silica glass as a base material and adding germanium oxide ($GeO_2$) to the core 22, or by using substantially pure silica glass (a trace quantity of impurities such as chlorine may be contained) for the core 22 and adding fluorine to the cladding 23. Comparing the above-described two forming methods, the latter allows a relatively longer transmission distance and higher power of the incident signal light, since transmission loss and non-linearity are lower in the case of the latter.

In either case, however, at a wavelength of 1550 nm, which is the signal light wavelength, the optical fiber 11 has a transmission loss of 0.25 dB/km or less, which is lower than that of the optical fiber 12. By designing the optical fiber 11 to have the transmission loss of 0.25 dB/km or below, the transmission distance can be made long. Also, at a wavelength of 1550 nm, which is the signal light wavelength, the optical fiber 11 has an effective area not smaller than 80 $\mu m^2$, and preferably, not smaller than 100 $\mu m^2$. As the effective area increases, the non-linearity decreases, and thereby degradation of the signal light waveform due to non-linear optical phenomena can be reduced, which allows an increase in the power of incident signal light.

Figure 3A:
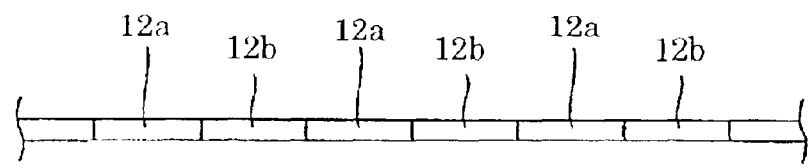
FIGS. 3A to 3C illustrate a second optical fiber 12, where
Figure 3B:
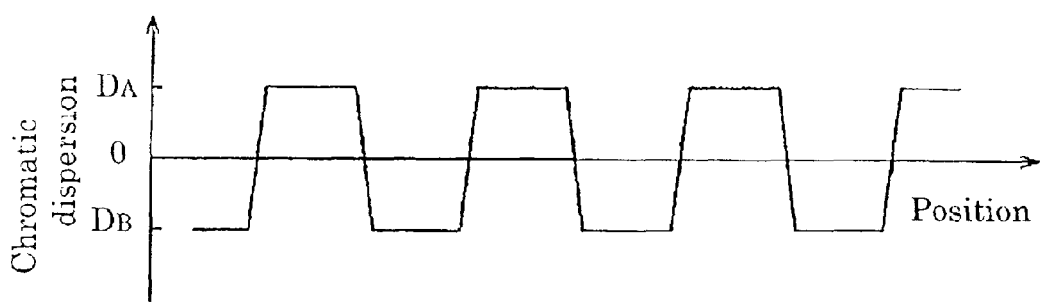
Figure 3C:
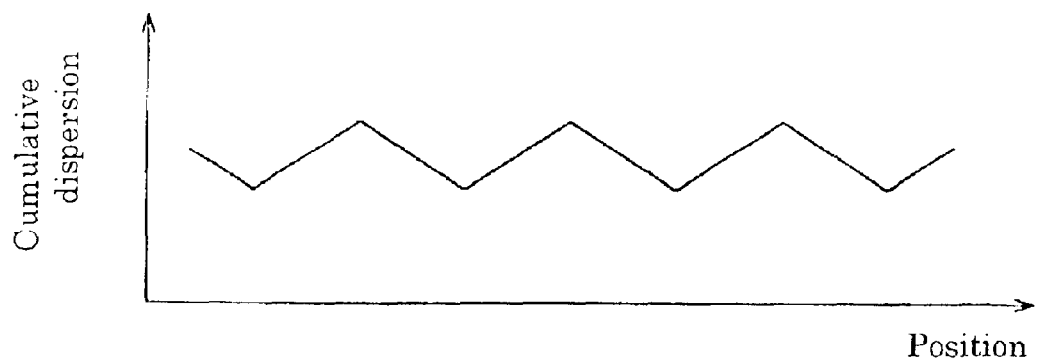

FIGS. 3A to 3C illustrate the optical fiber 12. FIG. 3A shows the outline of the optical fiber 12, FIG. 3B shows the chromatic dispersion at each position of the optical fiber 12, and FIG. 3C shows the cumulative dispersion at each position of the optical fiber 12. The optical fiber 12 has a configuration in which a positive dispersion region 12a having a positive chromatic dispersion $D_A$ at the wavelength of 1550 nm, and a negative dispersion region 12b having a negative chromatic dispersion $D_B$ at the wavelength of 1550 nm are alternately arranged. In each of the positive dispersion regions 12a, the cumulative dispersion of the optical fiber 12 gradually increases, whereas, in each of the negative dispersion regions 12b, the cumulative dispersion of the optical fiber 12 gradually decreases, thus repeating such increase and decrease. In FIG. 1B, the variation of the cumulative dispersion in the longitudinal direction is macroscopically exhibited, disregarding the above-mentioned increase and decrease.

As microscopically shown in FIG. 3C, the cumulative dispersion of the optical fiber 12 repeats its increase and decrease in the longitudinal direction. Therefore, if each of the positive and negative dispersion regions 12a and 12b is long and the absolute value of each of the chromatic dispersions $D_A$ and $D_B$ is large, the cumulative dispersion of the optical fiber 12 may possibly fall outside a tolerable range, depending on the position. Accordingly, it would be preferable that the product of the length of the positive dispersion region 12a and the chromatic dispersion $D_A$ do not become significantly large. Conversely, if the chromatic dispersion $D_A$ is too low, non-linear degradation tends to occur, and hence, the chromatic dispersion $D_A$ should be designed to have a value over a certain degree.

For example, the chromatic dispersion $D_A$ of the positive dispersion region 12a is +17 ps/nm/km, and the chromatic dispersion $D_B$ of the negative dispersion region 12b is −17 ps/nm/km, that is, the length ratio between the positive dispersion region 12a and the negative dispersion region 12b is 1:1. Alternatively, the chromatic dispersion $D_A$ is +4 ps/nm/km, and the chromatic dispersion $D_B$ is −4 ps/nm/km, that is, the length ratio therebetween is 1:1. More alternatively, the chromatic dispersion $D_A$ is +8 ps/nm/km, and the chromatic dispersion $D_B$ is −32 ps/nm/km, that is, the length ratio is 4:1. Even more alternatively, the chromatic dispersion $D_A$ is +4 ps/nm/km, and the chromatic dispersion $D_B$ is −40 ps/nm/km, that is, the length ratio $D_B/D_A$ is 10:1.

Figure 4:
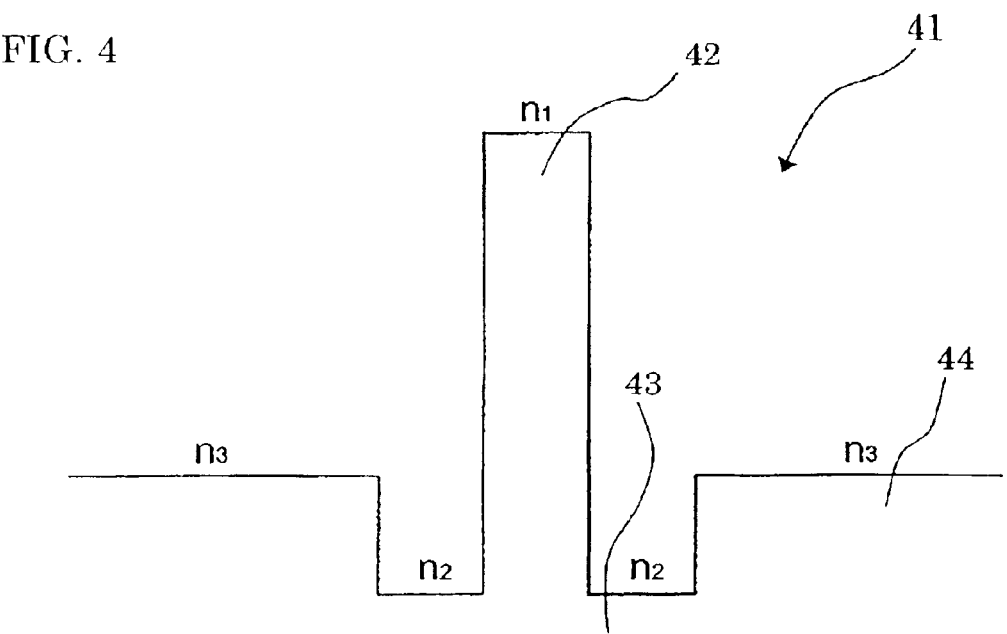
FIG. 4 shows a refractive index profile of the second optical fiber.

FIG. 4 shows a refractive index profile of the optical fiber 12. The illustrated optical fiber 12 having a refractive index profile 41 comprises a core 42 with a refractive index of $n_1$, a first cladding 43 with a refractive index of $n_2$, and a second cladding 44 surrounding the first cladding 43 and having a refractive index of $n_3$. Here, $n_1 > n_3 > n_2$. The optical fiber 12 is formed by using silica glass as a base material, and for example, by adding $GeO_2$ to the core 42, as well as adding fluorine to the first cladding 43.

Figure 5:
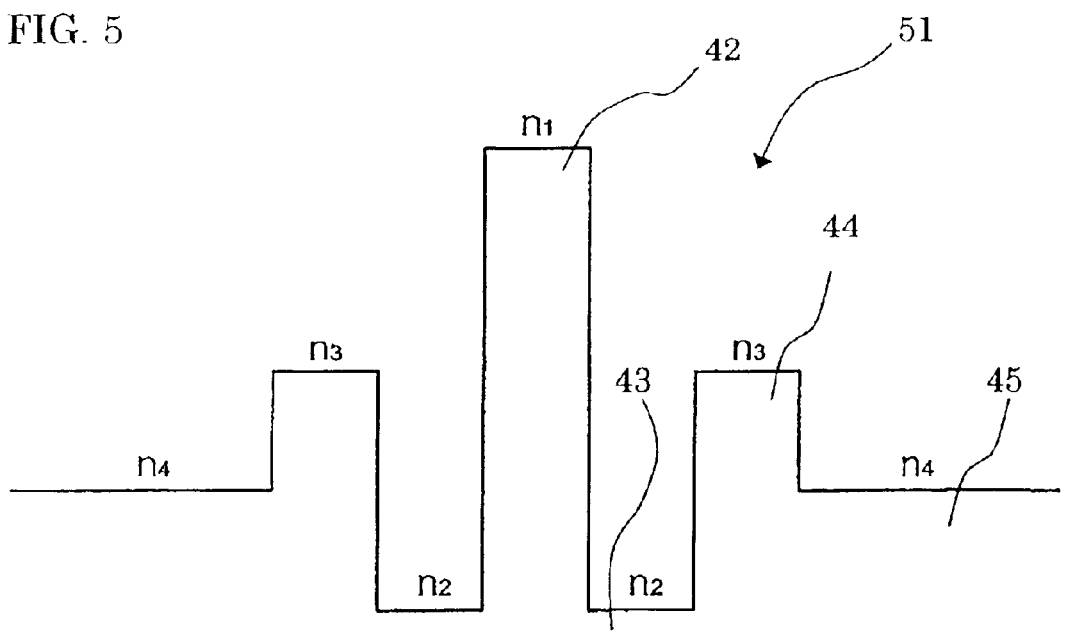
FIG. 5 shows another refractive index profile of the second optical fiber.

FIG. 5 shows another refractive index profile of the second optical fiber 12. The illustrated optical fiber 12 having a refractive index profile 51 further comprises a third cladding 45 having a refractive index of $n_4$ and formed outside the refractive index profile 41 shown in FIG. 4. Here, $n_1 > n_3 > n_4 > n_2$.

Figure 6:
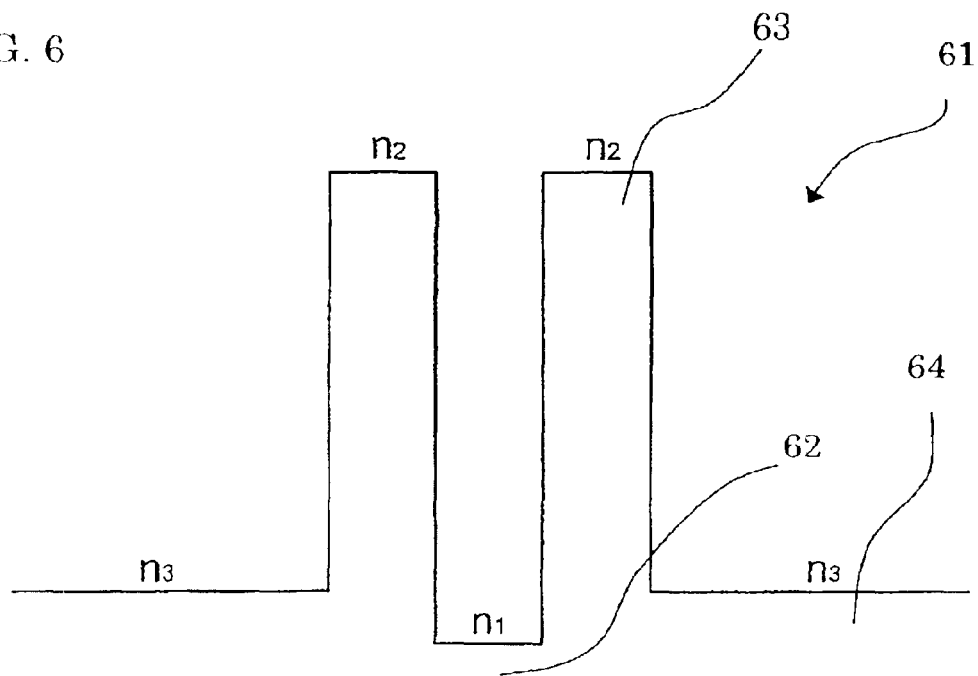
FIG. 6 shows still another refractive index profile of the second optical fiber.

FIG. 6 shows still another refractive index profile of the second optical fiber 12. The illustrated optical fiber 12 having a refractive index profile 61 comprises a first core 62 including the center of the optical axis and having a refractive index of $n_1$, a second core 63 surrounding the first core 62 and having a refractive index of $n_2$, and a cladding (first Cladding) 64 having a refractive index of $n_3$. Here, $n_2 > n_1$, and also $n_2 > n_3$. The optical fiber 12 is formed by using silica glass as a base material, and for example, by adding $GeO_2$ to the second core 63, as well as adding fluorine to the first core 62.

Figure 7:
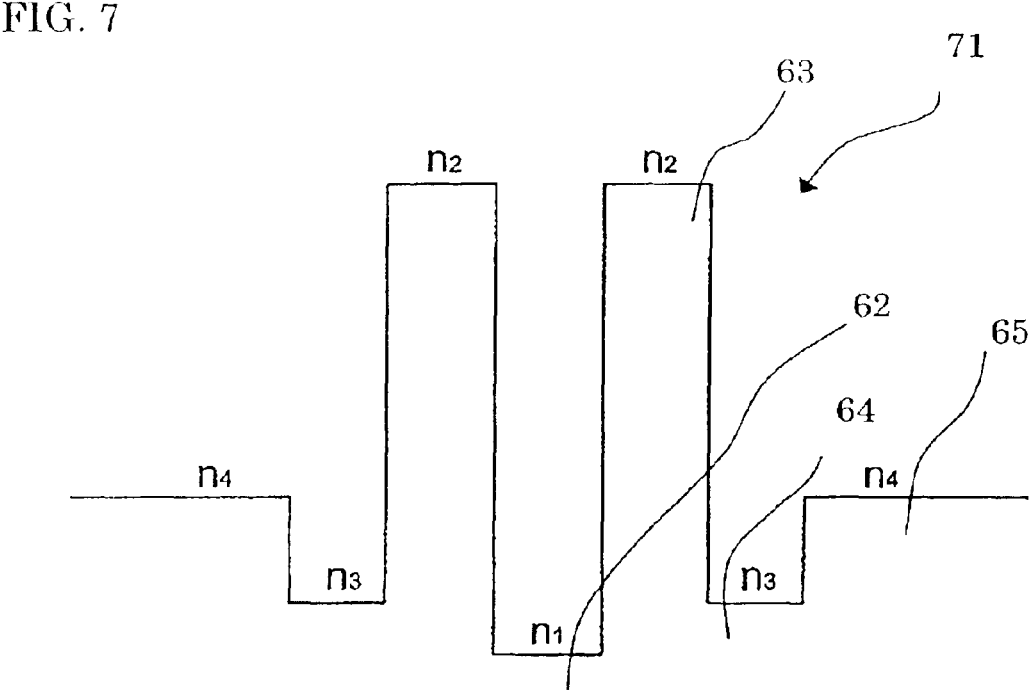
FIG. 7 shows a further example of a refractive index profile of the second optical fiber.

FIG. 7 shows a further example of a refractive index profile of the second optical fiber 12. The illustrated optical fiber 12 having a refractive index profile 71 comprises a second cladding 65 having a refractive index of $n_4$ and formed outside the first cladding 64 of the refractive index profile 61 shown in FIG. 6. Here, $n_2 > n_1$, $n_2 > n_3$, and also $n_4 > n_3$.

The optical fiber 12 having a refractive index profile shown in any of FIGS. 4 to 7 is desirable for reducing the absolute value of a dispersion slope and reducing the bending loss. Also, the optical fiber 12 can be designed to have a positive chromatic dispersion as well as a negative one by adjusting its outer diameter. For example, an optical fiber 12 in which positive and negative dispersion regions 12a and 12b are alternately arranged along the longitudinal direction can be produced by the following method: an optical fiber preform in which the outer diameter of each region is constant along the longitudinal direction thereof is prepared, and when this optical fiber preform is drawn into the optical fiber 12, the outer diameter of the fiber is made different between the positive dispersion region 12a and the negative dispersion region 12b.

Preferably, the absolute value of the dispersion slope in each of the positive and negative dispersion regions 12a and 12b of the optical fiber 12 is not higher than 0.04 ps/nm$^2$/km at a wavelength of 1550 nm. This enables the optical transmission line 10 to transmit multi-wavelength signal light in a broad band, thereby increasing transmission capacity.

It is preferable that the absolute value of the overall dispersion of the optical fiber 12 be not higher than 100 ps/nm at a wavelength of 1550 nm. It is also preferable that the absolute value of the overall average chromatic dispersion of the optical fiber 12 be not higher than 5 ps/nm/km at a wavelength of 1550 nm. In either case, even if the cumulative dispersion at each position on the optical transmission line 10 exceeds the overall dispersion of the optical fiber 11, the excess amount is negligible. This allows the upper limit of the cumulative dispersion to be reduced over the entire optical transmission line 10, thereby suppressing the signal degradation due to the cumulative dispersion.

As shown in FIGS. 3A to 3C, it is preferable that the optical fiber 12 be arranged so that positive dispersion regions 12a and negative dispersion regions 12b are alternately disposed along the longitudinal direction thereof. In this case, the cumulative dispersion at each position of the optical transmission line 10 gradually increases in the optical fiber 11 section and alternately and repeatedly increases and decreases in the optical fiber 12 section. Even if the cumulative dispersion at each position on the optical transmission line 10 exceeds the overall dispersion of the optical fiber 11, the excess amount is negligible. This enables the upper limit of the cumulative dispersion to be reduced over the entire optical transmission line 10, thereby inhibiting the signal degradation due to the cumulative dispersion.

Preferably, the optical fiber 12 is arranged such that the chromatic dispersion in each of the positive dispersion region 12a and negative dispersion regions 12b is not less than 5 ps/nm/km at the wavelength of 1550 nm and their respective length is not more than 5 km. Also, preferably, the optical fiber is arranged so that the absolute value of the average chromatic dispersion in each of the positive and negative dispersion regions 12a and 12b is not lower than 4 ps/nm/km at a wavelength of 1550 nm. In these cases, the signal degradation due to non-linear phenomena in the optical fiber 12 can be suppressed.

Figure 8A:
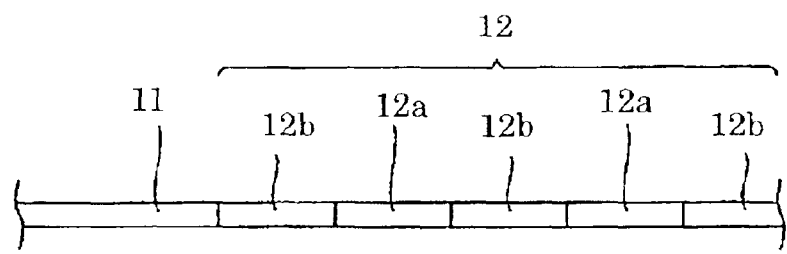
FIGS. 8A to 8C illustrate the first and second optical fibers at the vicinity of a connection between them, where
Figure 8B:
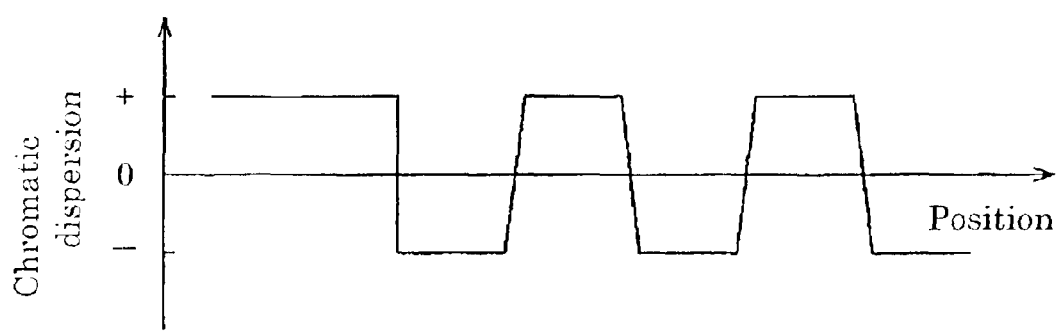
Figure 8C:
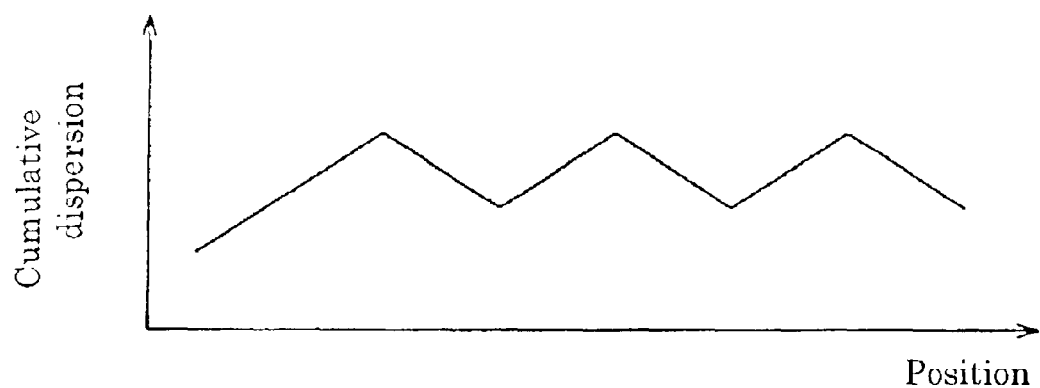

As shown in FIGS. 8A and 8B, it is preferable that a negative dispersion region 12b included in the optical fiber 12 be connected to the optical fiber 11. As shown in FIG. 8C, the case where the negative dispersion region 12b is connected to the optical fiber 11 allows the upper limit of the cumulative dispersion at each position of the optical fiber 12 to become low as compared with a case where the positive dispersion region 12a is connected to the optical fiber 11.

Preferably, the polarization mode dispersion of the optical transmission line 10 is not more than 0.2 ps/km$^{1/2}$ at a wavelength of 1550 nm. In this case, the optical communication system 1 is capable of high-speed transmission with a bit rate of 10 GB/s or above.

In the optical communication system 1, preferably a dispersion compensator having a chromatic dispersion whose sign is different from that of the first optical fiber 11 is provided in the repeater 15 so that the dispersion compensator compensates the chromatic dispersion of the optical transmission line 10. Preferably, the absolute value of the overall dispersion of the optical transmission line 10 including the dispersion compensator is not more than 100 ps/km at a wavelength of 1550 nm. In this manner, providing a dispersion compensator in the repeater or the like reduces the absolute value of the overall chromatic dispersion of the optical transmission line and thereby suppresses signal degradation due to the cumulative dispersion.

In the case of the optical transmission lines in the related arts 1 to 3, in order to avoid the signal degradation due to the cumulative dispersion (see, for example, a reference by T. Okuno, et al.: "Optimum dispersion of non-zero dispersion shifted fiber for high bit rate DWDM systems", Proceeding of OFC2001, TuH4 (2001)) in a positive dispersion optical fiber (which corresponds to the optical fiber 11 in the first embodiment) connected to a repeater or a transmitter, it is necessary to reduce the length of the positive dispersion optical fiber. If done so, however, non-linear optical phenomena would occur in a negative dispersion optical fiber, resulting in degradation of the waveform of the signal light, since signal light having a high power would be made incident upon the negative dispersion optical fiber having a small effective area and located downstream of the positive dispersion optical fiber. Thus, in the optical transmission lines according to the related arts 1 to 3 it is difficult to suppress both of the signal degradation due to cumulative dispersion and the signal degradation due to non-linear optical phenomena simultaneously.

Also, in the optical transmission line using the dispersion managed optical fiber according to the related art 4, it is difficult to suppress the signal degradation due to non-linear optical phenomena, since signal light propagates through the dispersion managed optical fiber having a small effective area and consequently a high non-linearity in its negative dispersion regions, while the power is still high.

The optical transmission line and the optical communication system according to the present invention have a long transmission distance, and are superior in the transmission quality of signal light, and hence, they have the advantage over the related arts 1 to 4. Reducing the power of the signal light emitted from a repeater (or transmitter) to the optical transmission line would eliminate the above-described problems. However, this would involve shortening the transmission distance, resulting in an increased number of repeaters and consequently an increased cost of the optical communication system.

Second Embodiment

Figure 9A:
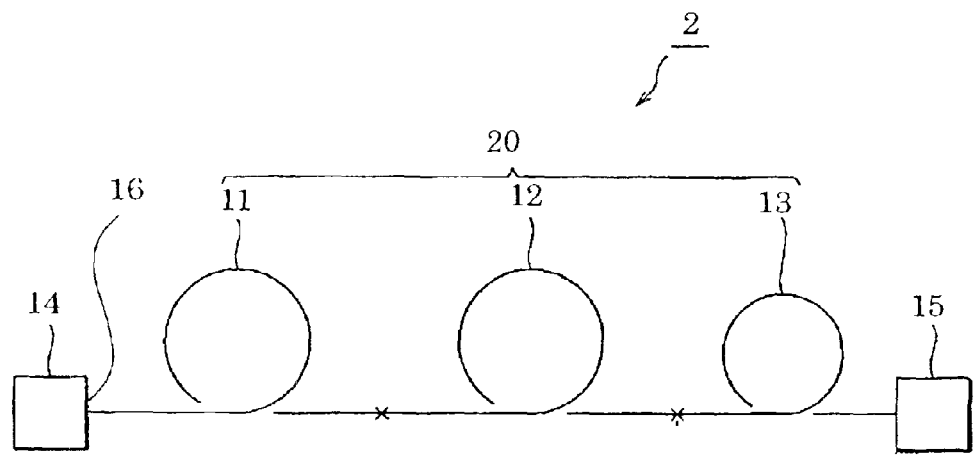
FIGS. 9A to 9C illustrate an optical communication system and an optical transmission line according to a second embodiment of the present invention, where
Figure 9B:
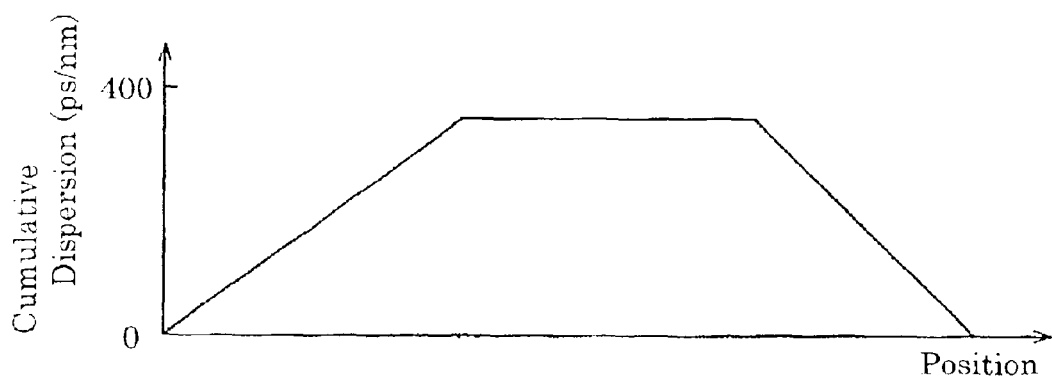
Figure 9C:
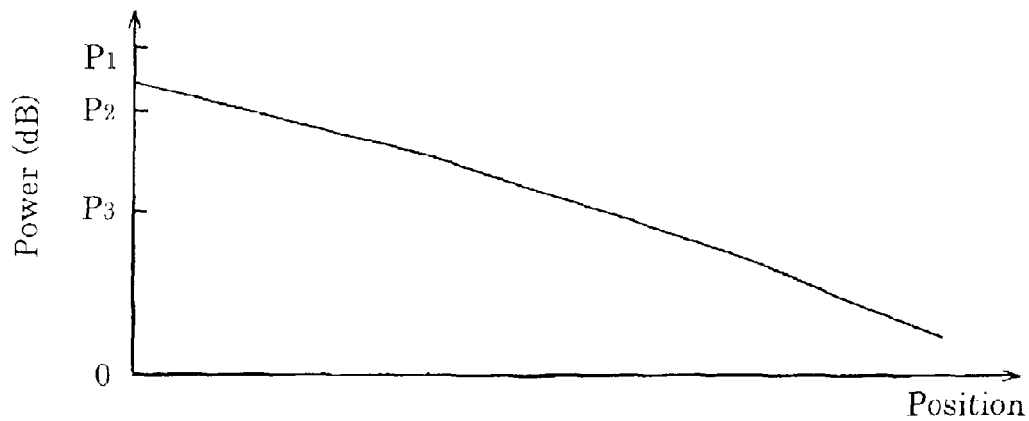

Next, descriptions will be made of a second embodiment of an optical communication system and an optical transmission line according to the present invention. FIGS. 9A to 9C illustrate an optical communication system 2 and an optical transmission line 20 according to the second embodiment. Here, FIG. 9A shows the configuration of the optical communication system 2, FIG. 9B shows the cumulative dispersion at each position on the optical transmission line 20, and FIG. 9C shows the signal light power at each position on the optical transmission line 20. Herein, FIG. 9B macroscopically exhibits a longitudinal distribution of the cumulative dispersion, as in the case of FIG. 1B.

As illustrated in FIG. 9A, the optical communication system 2 has a configuration in which the optical transmission line 20 is laid between the repeater (or transmitter) 14 and the repeater (or receiver) 15. The optical transmission line 20 is formed by fusion-splicing the first optical fiber 11, the second optical fiber 12, and a third optical fiber 13 that are arranged in this order from the upstream side to the downstream side. The optical fibers 11 and 12, and the repeaters 14 and 15 in this embodiment are each the same ones as those used in the above described first embodiment. The second embodiment is different from the first embodiment in that the optical communication system 2 and the optical transmission line 20 according to the second embodiment are further provided with the optical fiber 13. The third optical fiber 13 is connected to the downstream end of the optical fiber 12, and at a wavelength of 1550 nm, the third optical fiber 13 has a chromatic dispersion whose sign is different from that of the optical fiber 11. It is preferable that, at a wavelength of 1550 nm, the optical fiber 13 has a chromatic dispersion of −30 ps/nm/km or less and an effective area of 15 $\mu m^2$ or above.

As illustrated in FIG. 9B, the cumulative dispersion from the incident position 16 on the optical transmission line 20 to each position thereon varies among the optical fiber 11 section, the optical fiber 12 section, and the optical fiber 13 section. Specifically, in the optical fiber 11 section, the cumulative dispersion gradually increases with an increase in the propagation distance from the incident position 16, and the change in the cumulative dispersion is small in the optical fiber 12 section. In the optical fiber 13 section, where the chromatic dispersion thereof is constant along the longitudinal direction thereof, the cumulative dispersion gradually decreases with an increase in the propagation distance from the incident position 16. In this manner providing the optical fiber 13 reduces the absolute value of the overall dispersion of the optical transmission line 20. By appropriately setting the ratio of lengths among these optical fibers, it is possible to cause the overall dispersion of the optical transmission line 20 to approach zero.

As illustrated in FIG. 9C, the signal light power at each position on the optical transmission line 20 gradually decreases in any of the optical fiber 11 section, the optical fiber 12 section, and the optical fiber 13 section. In general, however, the optical fiber 12 has a lower loss than the optical fiber 13, and the optical fiber 11 has a lower loss than the optical fiber 12.

In the optical communication system 2, the signal light emitted from the repeater 14 propagates through the optical fiber 11, the optical fiber 12, and the optical fiber 13 in this order, and reaches the repeater 15. As in the case of the first embodiment, the occurrence of non-linear optical phenomena in the optical fibers 11 and 12, such as four-wave mixing, is low. The power of the signal light propagating through the optical fiber 13 is lower than that of the signal light propagating through the optical fibers 11 and 12, and therefore, in the optical fiber 13 also, the occurrence of non-linear optical phenomena such as four-wave mixing is low even if the optical fiber 13 has a high non-linearity. Thus, non-linear optical phenomena are reduced over the entire optical transmission line 20, and thereby signal degradation due to non-linear optical phenomena is suppressed.

As shown in FIG. 9C, the power of signal light at the incident position 16, and the power of signal light emitted from the optical fiber 11 and incident upon the optical fiber 12 are designed to be the predetermined powers $P_1$ and $P_2$ or less, respectively, so that the degree of the signal degradation due to non-linear optical phenomena in the optical fiber 12 falls within a tolerable range, as in the case of the first embodiment. Furthermore, the power of the signal light emitted from the optical fiber 12 and incident upon the optical fiber 13 is designed to be a predetermined powers $P_3$ or less so that the degree of signal degradation due to non-linear optical phenomena in the optical fiber 13 falls within a tolerable range. That is, the length of the optical fiber 11 is set such that the power of the signal light outputted from the optical fiber 11 and inputted into the optical fiber 12 becomes the predetermined power $P_2$ or less. Also, the length of each of the optical fibers 11 and 12 is set such that the power of the signal light outputted from the optical fiber 12 and inputted into the optical fiber 13 becomes the predetermined power $P_3$ or less.

As shown in FIG. 9B, the cumulative dispersion at each position of the optical transmission line 20 gradually increases in the optical fiber 11 section, and the change in the cumulative dispersion is small in the optical fiber 12 section. In the optical fiber 12 section, the change in the cumulative dispersion thereof is small. In the optical fiber 13 section, the cumulative dispersion thereof gradually decreases. Even if the cumulative dispersion at each position on the optical transmission line 20 exceeds the overall dispersion of the optical fiber 11, the excess amount is negligible. This makes it possible to reduce the upper limit of the cumulative dispersion over the entire optical transmission line 20, thereby suppressing the signal degradation due to the cumulative dispersion. From this viewpoint, it is preferable that the overall dispersion of the optical fiber 11 be not more than 400 ps/nm at a wavelength of 1550 nm.

Thus, providing the third optical fiber 13 reduces the absolute value of the overall chromatic dispersion of the optical transmission line 20, and thereby the signal degradation due to the cumulative dispersion is suppressed.

Preferably, the polarization mode dispersion of the optical transmission line 20 is not more than 0.2 ps/km$^{1/2}$ at a wavelength of 1550 nm. In this case, the optical communication system 2 is capable of high-speed transmission with a bit rate of 10 GB/s or above.

It is preferable that, at a wavelength of 1550 nm, the optical fiber 13 has a chromatic dispersion of −30 ps/nm/km or less and an effective area of 15 $\mu$m$^2$ or above. In this way, a high absolute value of the chromatic dispersion allows the length of the optical fiber 13 to be reduced, and a large effective area enables the non-linearity to be reduced. Also, preferably, the absolute value of the overall dispersion of the optical transmission line 20 is not more than 100 ps/km at a wavelength of 1550 nm.

Third Embodiment

Figure 10A:
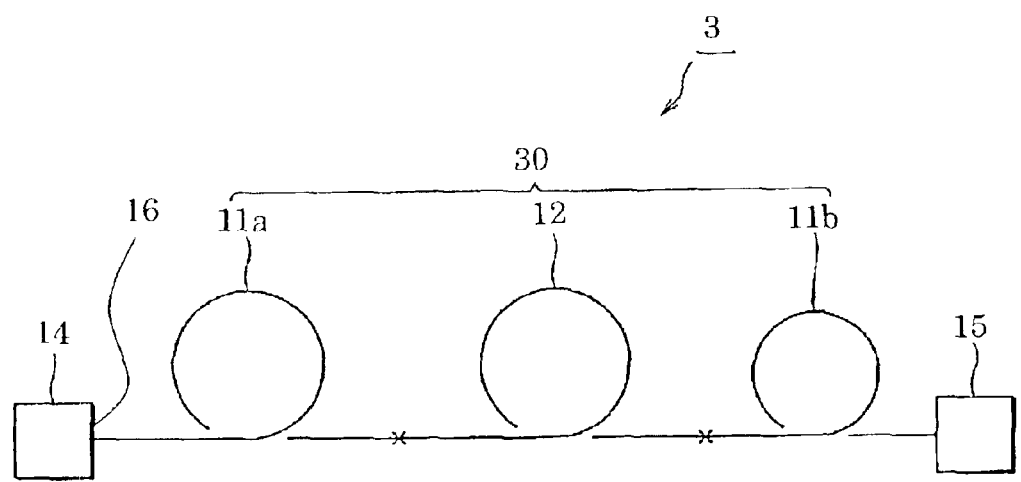
FIGS. 10A and 10B illustrate an optical communication system and an optical transmission line according to a third embodiment of the present invention, where
Figure 10B:
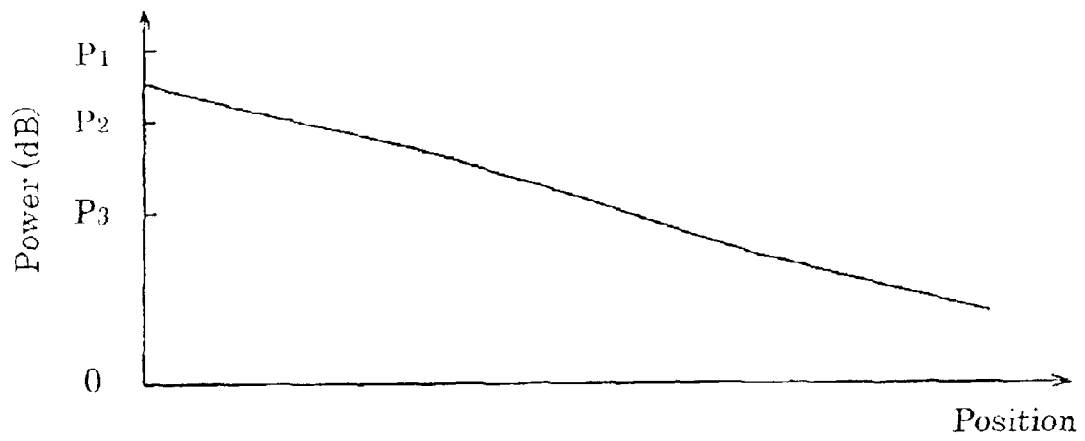

Next, descriptions will be made of a third embodiment of an optical communication system and an optical transmission line according to the present invention. FIGS. 10A and 10B illustrate an optical communication system 3 and an optical transmission line 30 according to the third embodiment. Here, FIG. 10A shows the configuration of the optical communication system 3, and FIG. 10B shows the signal light power at each position on the optical transmission line 30.

As illustrated in FIG. 10A, the optical communication system 3 has a configuration in which the optical transmission line 30 is laid between the repeater (or transmitter, or alternatively receiver) 14 and a repeater (or receiver, or alternatively transmitter) 15. The optical transmission line 30 is formed by fusion-splicing the first optical fiber 11a, the second optical fiber 12, and again the first optical fiber 11b that are arranged in this order from the repeater 14 to the repeater 15. The optical fiber 11a and the optical fiber 11b in this embodiment are the same ones as the above-described optical fiber 11. Also, the optical fiber 12, and the repeaters 14 and 15 are each the same ones as the above-described ones. The optical communication system 3 and the optical transmission line 30 according to this embodiment are different from those of the first embodiment in that the first optical fibers 11a and 11b are connected to both ends of the second optical fiber 12.

The cumulative dispersion from the position 16, where the signal light emitted from the repeater 14 is launched into the optical transmission line 30, to each position of the optical transmission line 30 varies among the optical fiber 11a section, the optical fiber 12 section, and the optical fiber 11b section. Specifically, in the optical fiber 11a section, the cumulative dispersion gradually increases with an increase in the propagation distance from the incident position 16. On the other hand, in the optical fiber 12 section, the change in the cumulative dispersion thereof is small irrespective of the position. In the optical fiber 11b section, the cumulative dispersion gradually increases with an increase in the propagation distance from the incident position 16.

As illustrated in FIG. 10B, the signal light power at each position on the optical transmission line 30 gradually decreases in any of the optical fiber 11a section, the optical fiber 12 section, and the optical fiber 11b section. In general, however, each of the optical fibers 11a and 11b has a lower loss than the optical fiber 12.

In the optical communication system 3, the signal light emitted from the repeater 14 propagates through the optical fiber 11a, the optical fiber 12, and the optical fiber 11b in this order, and reaches the repeater 15. As in the case of the first embodiment, the occurrence of non-linear optical phenomena in the optical fibers 11a and 11b, such as four-wave mixing, is low. The power of the signal light propagating through the optical fiber 11b is lower than that of the signal light propagating through the optical fiber 11a and 12, and hence, in the optical fiber 11b also, the occurrence of non-linear optical phenomena such as four-wave mixing is low. In this manner, when the signal light propagates from the repeater 14 to the repeater 15, the occurrence of non-linear optical phenomena is low over the entire optical transmission line 30, thereby suppressing signal degradation caused by the occurrence of non-linear optical phenomena.

Also, in this optical communication system 3, the signal light emitted from the repeater 15 propagates through the optical fiber 11b, the optical fiber 12, and the optical fiber 11a in this order, and reaches the repeater 14. In the case where the signal light propagates from the repeater 15 to the repeater 14 also, as in the case where the signal light propagates from the repeater 14 to the repeater 15, non-linear optical phenomena is reduced over the entire optical transmission line 30 and signal degradation due to non-linear optical phenomena is suppressed accordingly. Thus, use of this optical transmission line enables bi-directional transmission.

As illustrated in FIG. 10B, the power of the signal light at the incident position 16 is arranged to be the predetermined power $P_1$ or less so that the degree of the signal degradation caused by the occurrence of non-linear optical phenomena in the optical fiber 11a falls within a tolerable range. Also, the power of the signal light emitted from the optical fiber 11a and incident upon the optical fiber 12 is designed to be a predetermined power $P_2$ or less so that the degree of the signal degradation due to non-linear optical phenomena in the optical fiber 12 falls within a tolerable range. On the other hand, the power of the signal light emitted from the optical fiber 12 and incident upon the optical fiber 11b presents no problem since it has already become $P_1$ or below under normal conditions. That is, the length of the optical fiber 11 is set such that the power of the signal light outputted from the optical fiber 11a and inputted into the optical fiber 12 becomes the predetermined power $P_2$ or less. In the case where signal light is Raman-amplified in the optical transmission line 30, the power management described above becomes complicated, and hence, special attention should be given to the design and management of the length of an optical fiber.

The cumulative dispersion at each position of the optical transmission line 30 gradually increases in the optical fiber 11a section. On the other hand, in the optical fiber 12 section, the change in the cumulative dispersion thereof is small. In the optical fiber 11b section, the cumulative dispersion thereof gradually increases. In this embodiment, therefore, it is preferable to provide a dispersion compensator in the repeater 14 or 15.

Preferably, the polarization mode dispersion of the optical transmission line 30 is not more than 0.2 ps/km$^{1/2}$ at a wavelength of 1550 nm. In this case, the optical communication system 3 is capable of high-speed transmission with a bit rate of 10 GB/s or above.

Fourth Embodiment

Figure 11A:
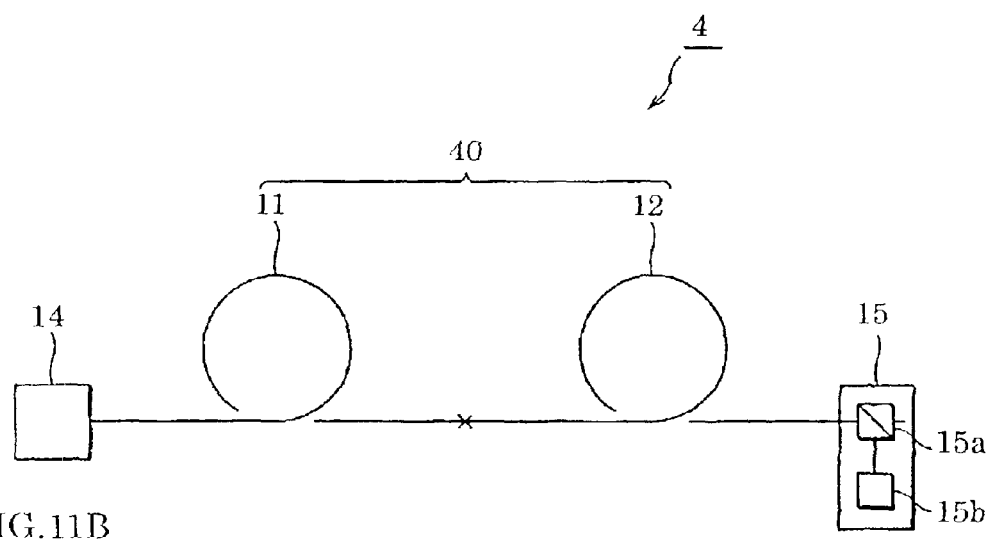
FIGS. 11A to 11C illustrate an optical communication system and an optical transmission line according to a fourth embodiment of the present invention, where
Figure 11B:
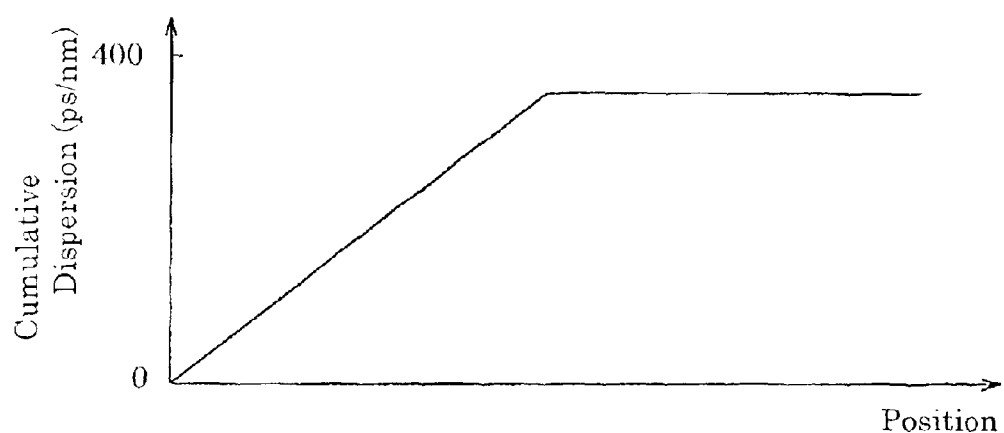
Figure 11C:
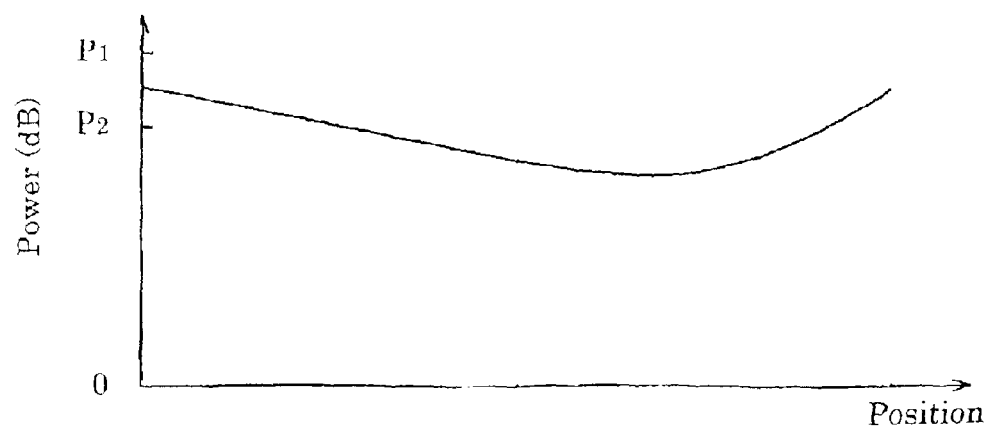

Next, descriptions will be made of a fourth embodiment of an optical communication system and an optical transmission line according to the present invention. FIGS. 11A and 11B illustrate an optical communication system 4 and an optical transmission line 40 according to the fourth embodiment. Here, FIG. 11A shows the configuration of the optical communication system 4, and FIG. 11B shows a cumulative dispersion at each position of the optical transmission line 40. FIG. 11C shows the signal light power at each position on the optical transmission line 40. Herein, FIG. 11B macroscopically exhibits a longitudinal distribution of the cumulative dispersion, as in the case of FIG. 1B. The optical communication system 4 according to this embodiment is different from the first embodiment in that a pump light multiplexer 15a and a pump light source 15b are provided in the repeater 15. The optical transmission line 40 is the same one as the optical transmission line 10 in the first embodiment.

The pump light source 15b serves the function of outputting pump light for Raman-amplifying the signal light on the optical transmission line 40. The pump light multiplexer 15a supplies the optical transmission line 40 with the pump light outputted from the pump light source 15b so as to propagate in the direction opposite to the propagating direction of the signal light through the optical transmission line 40. Specifically, the pump light outputted from the pump light source 15b is emitted from the repeater 15 through the pump light multiplexer 15a, and propagates through the optical fiber 12 and the optical fiber 11, in this order.

On the other hand, the signal light outputted from the repeater 14 first propagates through the optical fiber 11, and then propagates through the optical fiber 12. Although the signal light is subject to loss during the propagation, the supply of the pump light allows the signal light to be Raman-amplified, thereby compensating the loss. In the optical fiber 12, where the loss of the signal light is high, the Raman amplification of the signal light exhibits a high gain. Thus the loss of the optical transmission line 40 is partly or fully compensated by the Raman amplification of the signal light. In particular, since there is provided pump light propagating in the direction opposite to the propagating direction of the signal light through the optical transmission line 40, the signal light is Raman-amplified with a higher gain in the optical fiber 12 than in the optical fiber 11.

Fifth Embodiment

Figure 12A:
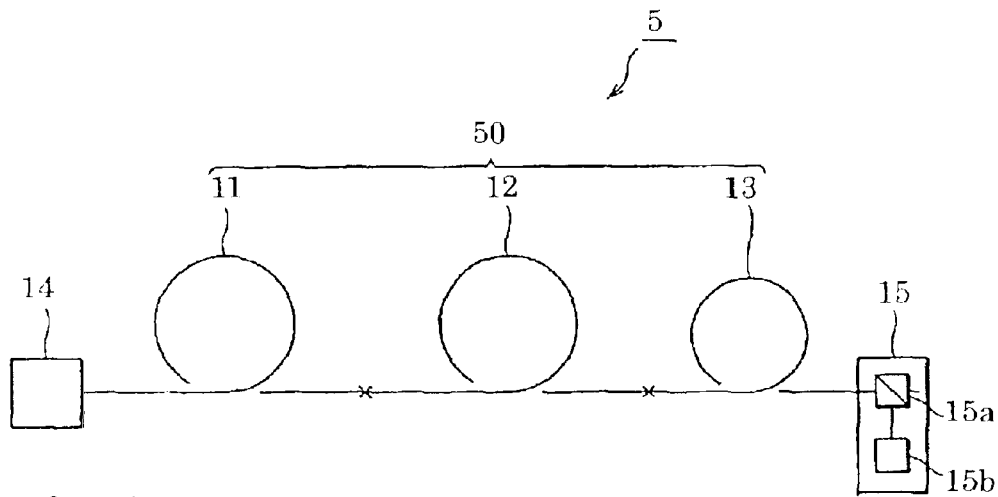
FIGS. 12A to 12C illustrate an optical communication system and an optical transmission line according to a fifth embodiment of the present invention, where
Figure 12B:
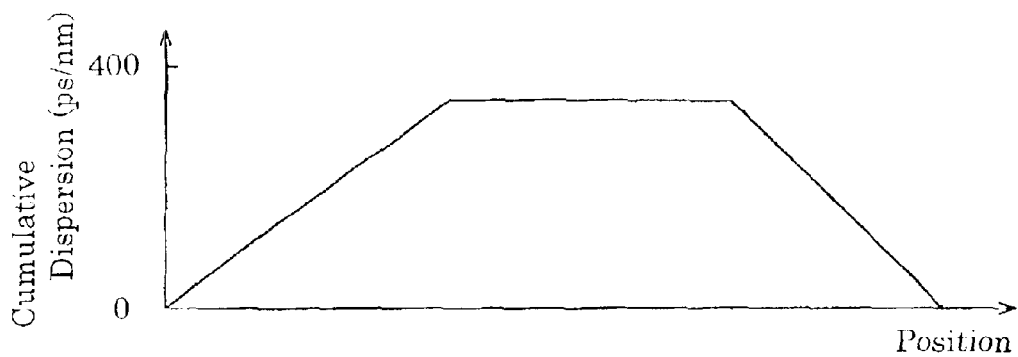
Figure 12C:
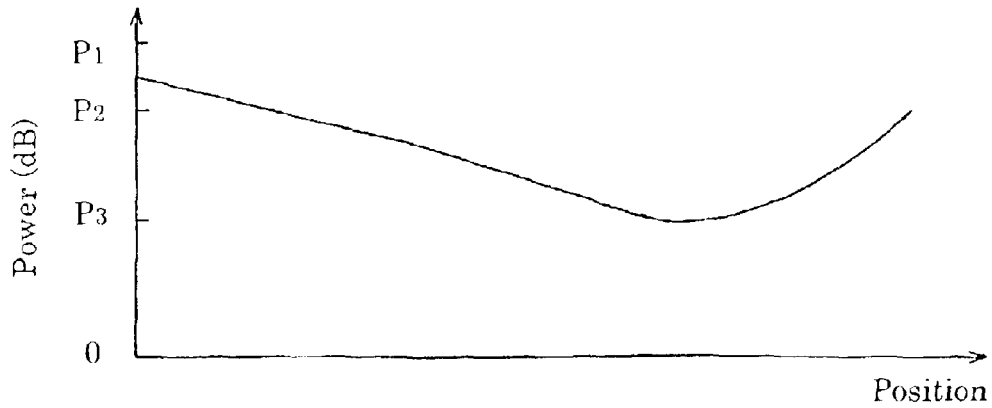

Next, descriptions will be made of a fifth embodiment of an optical communication system and an optical transmission line according to the present invention. FIGS. 12A to 12C illustrate an optical communication system 5 and an optical transmission line 50 according to the fifth embodiment. Here, FIG. 12A shows the configuration of the optical communication system 5, FIG. 12B shows the cumulative dispersion at each position of the optical transmission line 50, and FIG. 12C shows the signal light power at each position on the optical transmission line 50. Herein, FIG. 12B macroscopically exhibits a longitudinal distribution of the cumulative dispersion, as in the case of FIG. 1B. The optical communication system 5 according to this embodiment is different from the second embodiment in that a pump light multiplexer 15a and a pump light source 15b are provided in the repeater 15. The optical transmission line 50 is the same one as the optical transmission line 20 in the second embodiment.

The pump light source 15b serves the function of outputting pump light for Raman-amplifying the signal light on the optical transmission line 50. The pump light multiplexer 15a supplies the optical transmission line 50 with the pump light outputted from the pump light source 15b so as to propagate in the direction opposite to the propagating direction of the signal light through the optical transmission line 50. Specifically, the pump light outputted from the pump light source 15b is emitted from the repeater 15 through the pump light multiplexer 15a, and propagates through the optical fiber 13, the optical fiber 12, and the optical fiber 11, in this order.

On the other hand, the signal light outputted from the repeater 14 propagates through the optical fiber 11, the optical fiber 12 and the optical fiber 13, in this order. Although the signal light is subject to loss during the propagation, the supply of the pump light allows the signal light to be Raman-amplified, thereby compensating the loss. In the optical fiber 13, where the loss of signal light is high, the Raman amplification of the signal light exhibits a high gain. The loss of the optical transmission line 50 is thus compensated by the Raman amplification of signal light. In particular, since there is provided pump light propagating in the direction opposite to the propagating direction of the signal light through the optical transmission line 50, the signal light is Raman-amplified with a higher gain in the optical fiber 12 than in the optical fiber 11, and with an even higher gain in the optical fiber 13 than in the optical fiber 12.

While the present invention has been described with reference to what are at present considered to be the preferred embodiments, it is to be understood that various changes and modifications may be made thereto without departing from the invention in its broader aspects and therefore, it is intended that the appended claims cover all such changes and modifications that fall within the true spirit and scope of the invention.

The entire disclosure of Japanese Patent Application No. 2001-259832 filed on Aug. 29, 2001 including specification, claims, drawings, and summary are incorporated herein by reference in its entirety.

What is claimed is:

1. An optical transmission line comprising a first optical fiber and a second optical fiber which are connected together, said first optical fiber having an effective area not less than 80 $\mu m^2$ at a wavelength of 1550 nm, said second optical fiber having at least one positive dispersion region and at least one negative dispersion region, wherein said at least one positive dispersion region has a positive chromatic dispersion and said at least one negative dispersion region has a negative chromatic dispersion, respectively at a predetermined wavelength in a signal wavelength band, and the absolute value of the chromatic dispersion in said at least one positive dispersion region or at least said one negative dispersion region is not less than 5 ps/nm/km at said predetermined wavelength, and wherein the length of said at least one positive dispersion region or said at least one negative dispersion region is not more than 5 km.

2. An optical transmission line according to claim 1, wherein said effective area is not less than 100 $\mu m^2$ at said predetermined wavelength.

3. An optical transmission line according to claim 1, wherein the core of said first optical fiber is formed of substantially pure silica glass.

4. An optical transmission line according to claim 1, wherein the overall dispersion of said first optical fiber is not more than 400 ps/nm at said predetermined wavelength.

5. An optical transmission line according to claim 1, wherein the transmission loss of said first optical fiber is not more than 0.25 dB/km at said predetermined wavelength.

6. An optical transmission line according to claim 1, wherein the transmission loss of said first optical fiber is less than that of said second optical fiber.

7. An optical transmission line according to claim 1, wherein the absolute value of the dispersion slope in said at least one positive dispersion region is not more than 0.04 ps/nm²/km at said predetermined wavelength.

8. An optical transmission line according to claim 1, wherein the absolute value of the dispersion slope in said at least one negative dispersion region is not more than 0.04 ps/nm$_2$/km predetermined wavelength.

9. An optical transmission line according to claim 1, wherein the absolute value of the overall dispersion of said second optical fiber is not more than 100 ps/nm at said predetermined wavelength.

10. An optical transmission line according to claim 1, wherein the absolute value of the average chromatic dispersion of said second optical fiber is not more than 5 ps/nm/km at said predetermined wavelength.

11. An optical transmission line according to claim 1, wherein said second optical fiber is designed such that said at least one positive dispersion region and said at least one negative dispersion region are alternately arranged in the longitudinal direction thereof.

12. An optical transmission line according to claim 1, wherein the chromatic dispersion in said at least one positive dispersion region is not less than 5 ps/nm/km at said predetermined wavelength, and wherein the length of said at least one positive dispersion region is not more than 5 km.

13. An optical transmission line according to claim 1, wherein the absolute value of the chromatic dispersion in said at least one negative dispersion region is not less than 5 ps/nm/km at said predetermined wavelength, and wherein the length of said at least one negative dispersion region is not more than 5 km.

14. An optical transmission line according to claim 1, wherein the average chromatic dispersion in said at least one positive dispersion region is not less than 4 ps/nm/km at said predetermined wavelength.

15. An optical transmission line according to claim 1, wherein the absolute value of the average chromatic dispersion in said at least one negative dispersion region is not less than 4 ps/nm/km at said predetermined wavelength.

16. An optical transmission line according to claim 1, wherein said at least one negative dispersion region is connected to said first optical fiber.

17. An optical transmission line according to claim 1, wherein said second optical fiber comprises:
  a core including the center of an optical axis and having a first refractive index;
  a first cladding surrounding said core and having a second refractive index lower than said first refractive index; and
  a second cladding surrounding said first cladding and having a third refractive index higher than said second refractive index.

18. An optical transmission line according to claim 17, wherein the second optical fiber further comprises a third cladding surrounding said second cladding and having a fourth refractive index lower than said third refractive index.

19. An optical transmission line according to claim 1, wherein said second optical fiber comprises:
  a first core including an optical axis at the center thereof and having a first refractive index;
  a second core surrounding said first core and having a second refractive index higher than said first refractive index; and
  a cladding surrounding said second core and having a third refractive index lower than said second refractive index.

20. An optical transmission line according to claim 19, wherein said second optical fiber further comprises:
  a second cladding surrounding said first cladding and having a fourth refractive index higher than said third refractive index.

21. An optical transmission line according to claim 1, wherein the polarization mode dispersion is not more than 0.2 ps/km$^{1/2}$ at said predetermined wavelength.

22. An optical transmission line according to claim 1, wherein a plurality of said first optical fibers are connected to both ends of said second optical fiber.

23. An optical transmission line according to claim 1, further comprising a dispersion compensator for reducing the absolute values of the chromatic dispersions of both of said first and second optical fibers at said predetermined wavelength.

24. An optical transmission line according to claim 23, wherein the absolute value of the overall dispersion is not more than 100 ps/km at said predetermined wavelength.

25. An optical transmission line according to claim 1, further comprising a third optical fiber provided for reducing the absolute values of the chromatic dispersions of both of said first and second optical fibers at said predetermined wavelength.

26. An optical transmission line according to claim 25, wherein, at said predetermined wavelength, said third optical fiber has a chromatic dispersion 10 not more than −30 ps/nm/km and an effective area not less than 15 $\mu$m$^2$.

27. An optical transmission line according to claim 25, wherein the absolute value of the overall dispersion is not more than 100 ps/km at said predetermined wavelength.

28. An optical communication system comprising an optical transmission line formed by connecting a first optical fiber and a second optical fiber together,
  wherein optical communication is performed by transmitting signal light through said first optical fiber and then through said second optical fiber, said first optical fiber having an effective area not less than 80 $\mu$m$^2$ at a wavelength of 1550 nm, said second optical fiber having at least one positive dispersion region and at least one negative dispersion region,
  said at least one positive dispersion region has a positive chromatic dispersion and said at least one negative dispersion region has a negative chromatic dispersion, respectively, in the longitudinal direction at a predetermined wavelength within a signal wavelength band, and
  the absolute value of the chromatic dispersion in said at least one positive dispersion region or at least said one negative dispersion region is not less than 5 ps/nm/km at said predetermined wavelength, and wherein the length of said at least one positive dispersion region or said at least one negative dispersion region is not more than 5 km.

29. An optical communication system according to claim 28, further comprising a third optical fiber for reducing the absolute values of the chromatic dispersions of both of said first and second optical fibers at said predetermined wavelength,
  wherein optical communication is performed by transmitting signal light through said first optical fiber, said second optical fiber, and said third optical fiber in this order.

30. An optical communication system according to claim 29, further comprising pump light supplying means for supplying pump light propagating in the direction opposite to the propagating direction of said signal light in said optical transmission line,
  wherein said signal light is Raman-amplified in said optical transmission line by supplying said pump light to said optical transmission line by said pump light supplying means.

31. An optical communication system according to claim 28, further comprising a pump light supplying means for supplying pump light propagating in the direction opposite to the propagating direction of signal light in said optical transmission line,
- wherein said signal light is Raman-amplified in said optical transmission line by supplying said pump light to said optical transmission line by said pump light supplying means.

32. An optical transmission line comprising a first optical fiber and a second optical fiber which are connected together, said first optical fiber having an effective area not less than 80 $\mu m^2$ at a wavelength of 1550 nm, said second optical fiber having at least two positive dispersion regions and at least two negative dispersion regions,
- wherein said at least two positive dispersion regions have a positive chromatic dispersion and said at least two negative dispersion regions have a negative chromatic dispersion, respectively at a predetermined wavelength in a signal wavelength band, and
- the absolute value of the dispersion slope in said at least two positive dispersion regions or said at least two negative dispersion regions is not more than 0.04 ps/nm$^2$/km at said predetermined wavelength.

33. An optical transmission line comprising a first optical fiber and a second optical fiber which are connected together, said first optical fiber having an effective area not less than 80 $\mu m^2$ at a wavelength of 1550 nm, said second optical fiber having at least one positive dispersion region and at least one negative dispersion region,
- wherein said at least one positive dispersion region has a positive chromatic dispersion and said at least one negative dispersion region has a negative chromatic dispersion, respectively at a predetermined wavelength in a signal wavelength band,
- the absolute value of the dispersion slope in said at least one positive dispersion region or said at least one negative dispersion region is not more than 0.04 ps/nm$^2$/km at said predetermined wavelength, and
- an accumulated dispersion value form the input end of first optical fiber to any point of second optical fiber is not less than zero.

34. An optical communication system comprising an optical transmission line formed by connecting together a first optical fiber and a second optical fiber,
- wherein optical communication is performed by transmitting signal light through said first optical fiber and then through said second optical fiber, said first optical fiber having an effective area not less than 80 $\mu m^2$ at a wavelength of 1550 nm, said second optical fiber having at least two positive dispersion regions and at least two negative dispersion regions,
- said at least two positive dispersion regions have a positive chromatic dispersion and said at least two negative dispersion regions have a negative chromatic dispersion, respectively, in the longitudinal direction at a predetermined wavelength within a signal wavelength band, and
- the absolute value of the dispersion slope in said at least two positive dispersion regions or said at least two negative dispersion regions is not more than 0.04 ps/nm$^2$/km at said predetermined wavelength.

35. An optical communication system comprising an optical transmission line formed by connecting together a first optical fiber and a second optical fiber,
- wherein optical communication is performed by transmitting signal light through said first optical fiber and then through said second optical fiber, said first optical fiber having an effective area not less than 80 $\mu m^2$ at a wavelength of 1550 nm, said second optical fiber having at least one positive dispersion region and at least one negative dispersion region,
- said at least one positive dispersion region has a positive chromatic dispersion and said at least one negative dispersion region has a negative chromatic dispersion, respectively, in the longitudinal direction at a predetermined wavelength within a signal wavelength band,
- the absolute value of the dispersion slope in said at least one positive dispersion region or said at least one negative dispersion region is not more than 0.04 ps/nm$^2$/km at said predetermined wavelength, and
- an accumulated dispersion value from the input end of first optical fiber to any point of second optical fiber is not less than zero.

* * * * *